United States Patent Office — 3,586,710, Patented June 22, 1971

3,586,710
ESTROGENIC B-NOR STEROIDS
Marinus Los, Trenton, N.J., assignor to American
Cyanamid Company, Stamford, Conn.
No Drawing. Filed Nov. 12, 1968, Ser. No. 775,106
Int. Cl. C07c 43/20, 49/76, 69/14
U.S. Cl. 260—488CD                                          6 Claims

ABSTRACT OF THE DISCLOSURE

This invention relates to B-nor steroids, a method for the preparation of said compounds from simpler moieties and to the use of said compounds as estrogenic agents in the treatment of warm-blooded animals.

SUMMARY OF THE INVENTION

This invention relates to new, estrogenic, B-nor steroids of the formulae:

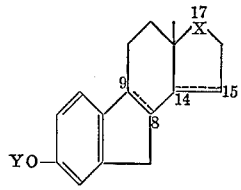

or

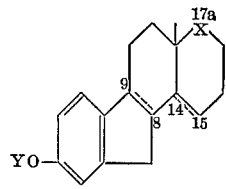

wherein Y is hydrogen or lower alkyl (C$_1$–C$_4$) and X is

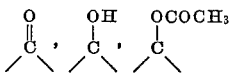

or

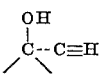

and provided that where no double bond exists at C–14, the hydrogen at C–14 is α and that where no double bond exists at C–8 or C–14 the hydrogen at C–14 is α and the hydrogens at C–8 and C–9 are both α or both β. This invention further relates to a method for the preparation of the above described B-nor steroids and to the use of such compounds as estrogenic agents for the treatment of warm-blooded animals such as domestic, laboratory and farm animals. As used in the generic formulas set forth above and hereinafter throughout the specification and appended claims, the dotted lines (i.e., – – – –) are meant to indicate that a double bond exists at that site in certain specific compounds within the scope of the generic formulas but does not exist at the site in other specific compounds, likewise within the scope of such generic formulas.

It has been established that some B-nor steroids have biological activity. (J. F. Kerwin, U.S. Pat. 3,334,140). The first B-nor steroids were prepared by conversion from normal steroids. This route is attractive only because it allows one to have predictable stereochemistry at positions 8 and 9. It has recently been found that it is not necessary nor advantageous to have the naturally occurring ring configurations at all ring junctions to obtain interesting and high biological activity. (H.F.L. Schuler, Acta Endocrinol 35, 188–196 (1960): CA 55, 799) Preparing "retro" steroids from natural products is long and difficult. A totally synthetic approach offers a distinct advantage in that it is easier to prepare compounds for evaluation of their biological utility, many of which are not available by routes from naturally occurring intermediates.

We have found a procedure to prepare the B-nor steroid system from 5-methoxyindan-1-one as follows:

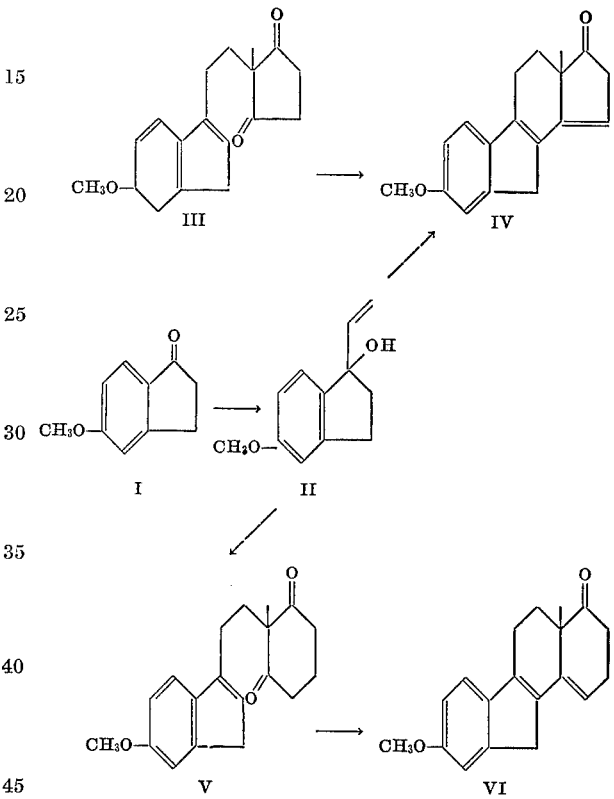

The 5-methoxyindan-1-one has been prepared by cyclization of m-methoxyphenylpropionic acid and from 5-methoxyindane by chromic acid oxidation. We have found the chromic acid oxidation method well suited to the preparation of large amounts of the ketone provided ethyl acetate is substituted for chloroform in the extraction of the product from the aqueous solution.

The reaction of the indanone (I) with vinyl magnesium bromide yields the vinyl alcohol (II) in nearly quantitative yield. This compound is readily polymerized with acids. It appears quite stable otherwise. In the presence of excess pyridine the vinyl alcohol readily condenses with 2-methylcyclopentane-1,3-dione to form (III) or with 2-methylcyclohexane-1,3-dione to yield (V) both in excellent yield. The diones are acidic compounds and it is imperative that the dione be mixed with pyridine prior to the addition of the vinyl alcohol to avoid a rapid polymerization of the alcohol.

The cyclodehydration with methanolic hydrogen chloride of (III) to the tetracyclic system (IV) is easily accomplished. When (IV) is hydrogenated in benzene over palladium on calcium carbonate, one equivalent of hydrogen is rapidly taken up to yield a mixture of products from which the trans isomer (VII) readily crystallizes out from methanol in 56% yield. When the reduction is allowed to proceed until the hydrogen absorption ceases the 6 - methoxy - B - nor - 8α - estra - 1,3,5(10) - trien-17-one (VIII) can be obtained in 39% yield directly by crystallization from absolute ethanol. The isomeric 6-methoxy - B - nor - 9B - estra - 1,3,5(10) - trien - 17 - one (IX) is probably present although it was not readily isolated in pure form.

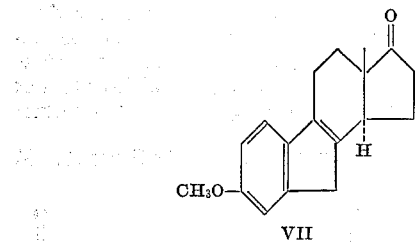

VII

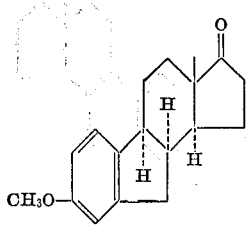

VIII

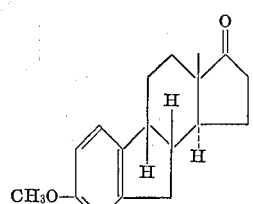

IX

Reduction of the ketone (IV) with sodium borohydride in ethanol yields the 17β-ol (X) in excellent yield. Treatment of (X) with acetic anhydride in pyridine gives the expected acetate (XI). When either the alcohol (X) or the ester (XI) are hydrogenated in benzene over palladium on calcium carbonate the reduction is very selective and yields the expected trans alcohol (XII) or acetate (XIII) in 78% and 67% by direct crystallization. A sodium-NH₃ reduction

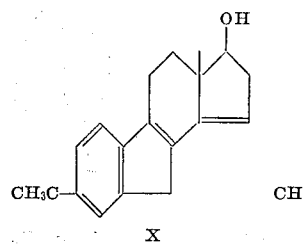

X

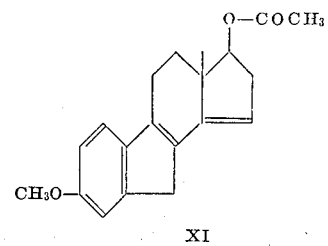

XI

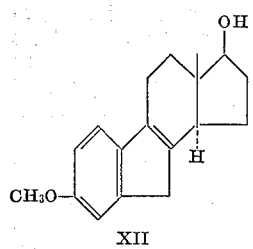

XII

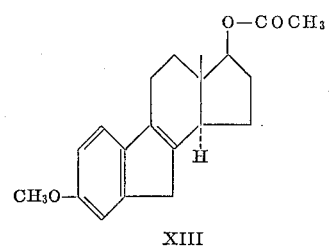

XIII gives products that tend not to crystallize. We have found that it is advantageous to employ the acetate (XI) and (XIII) for the catalytic reductions since they are more soluble in the solvents that are generally employed in reductions. Over palladium on carbon, (XI) is readily reduced to (XIII) in benzene. Compound (XIII) in benzene over palladium on calcium carbonate reduces in good yield to crystalline 6-methoxy-B-nor-8α-estra-1,3,5 (10)-trien-17β-ol acetate (XIV) in 65% yield. In acetic acid-perchloric acid (XIII) reduces very stereoselectively to an oily product which is assigned the structure (XV). When converted to the alcohol and oxidized with Jones reagent it yields the ketone (IX).

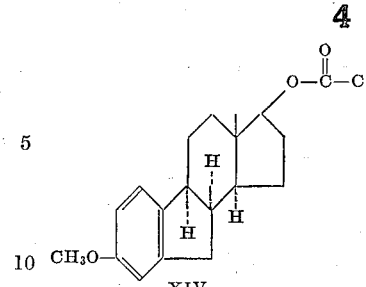

XIV

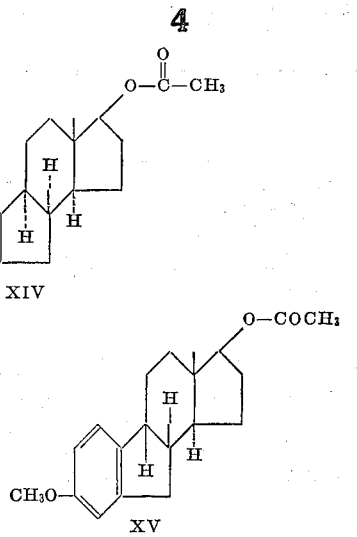

XV

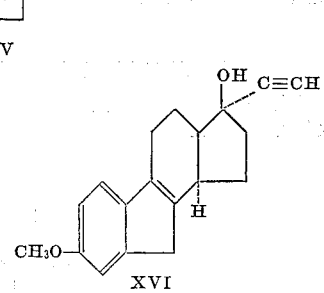

XVI

The (±)-3-methoxy-B-norestra-1,3,5(10),8-tetraen-17-one (VII) when reacted with sodium acetylide yields (±)-17α-ethynyl-3-methoxy - B - norestra-1,3,5(10),8-tetraen-17β-ol (XVI).

The vinyl alcohol (II) condenses readily with 2-methyl-cyclohexane-1,3-dione to yield (V) in excellent yield. Ring closure with acid yields (±)-3-methoxy-B-nor-D-homo-estra-1,3,5(10),8,14-pentaen - 17α - one (VI). This compound hydrogenates very stereoselectively over palladium-calcium carbonate to give an 89% yield of pure (±)-3-methoxy-B-nor - D - homo-1,3,5(10),8-tetraen-17α-one (XVII). When the reduction is allowed to proceed under the same conditions until the hydrogenation stops, the product appears to be a mixture from which no pure product was obtained. The ketone (VI) is reduced stereoselectively with sodium borohydride to (XVIII). Hydrogenation of this diene in benzene over palladium-calcium carbonate gave (±)-3-methoxy-B-nor - D - homo-estra-1,3,5 (10),8-tetraen-17αβ-ol (XIX) in 46% yield. When the reduction was allowed to proceed until the reduction stopped, a mixture was obtained from which one isomer (XX) was obtained from 95% ethanol in low yield. The stereochemistry of this compound is at present unknown.

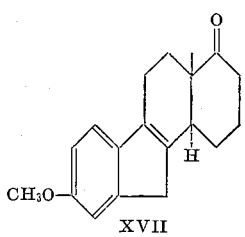

XVII

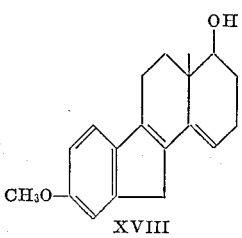

XVIII

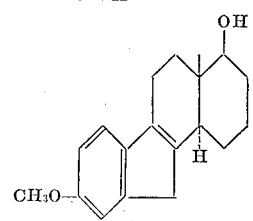

XIX

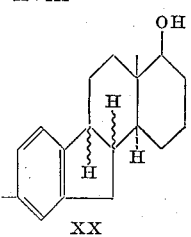

XX

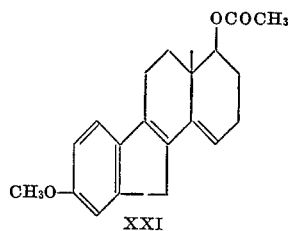

Acylation of (XVIII) with acetic anhydride yields the expected acetate (XXI) in good yield. These compounds can be used to prepare B-nor-D-homo steroids by the procedures detailed for the intermediates prepared from cyclopentane 1,3-dione.

For convenience, the synthesis for the compounds of the present invention is graphically illustrated in Flow Diagrams I and II below.

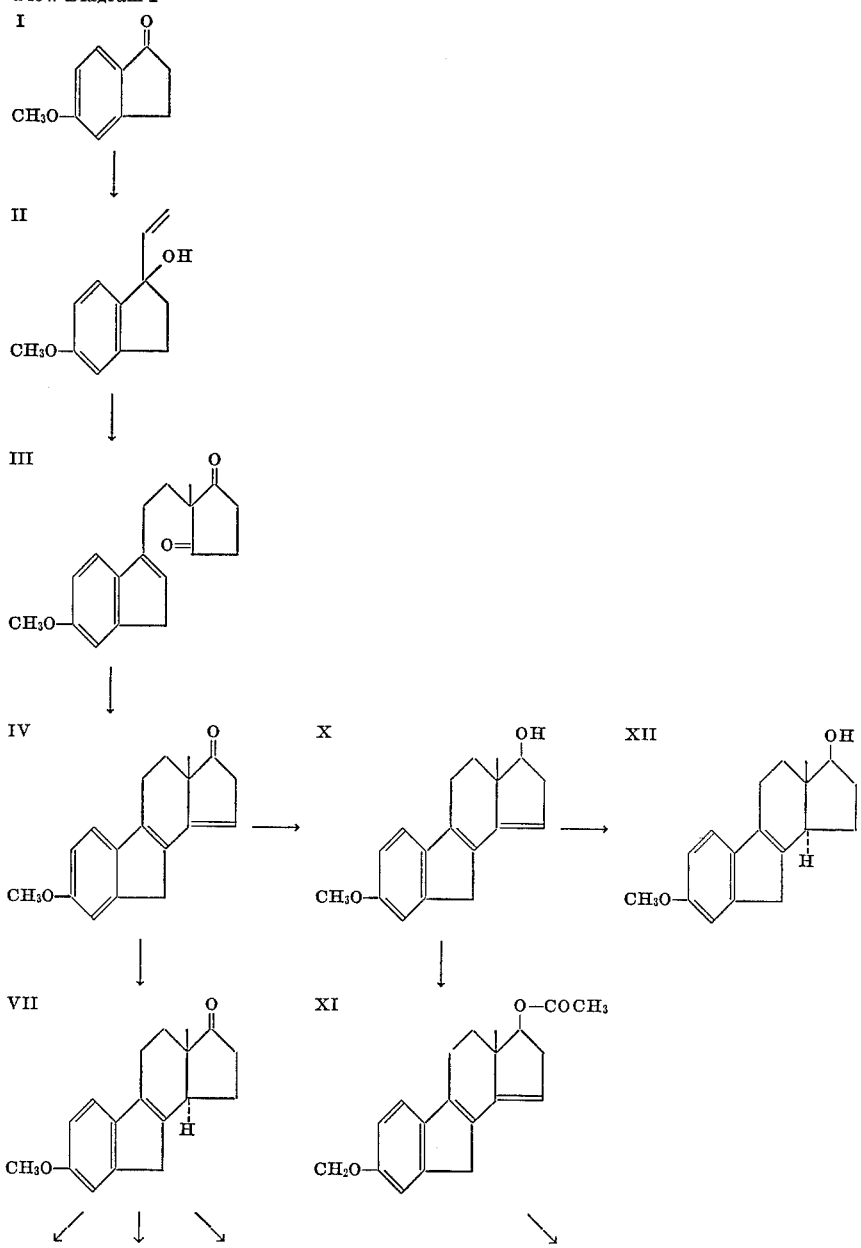

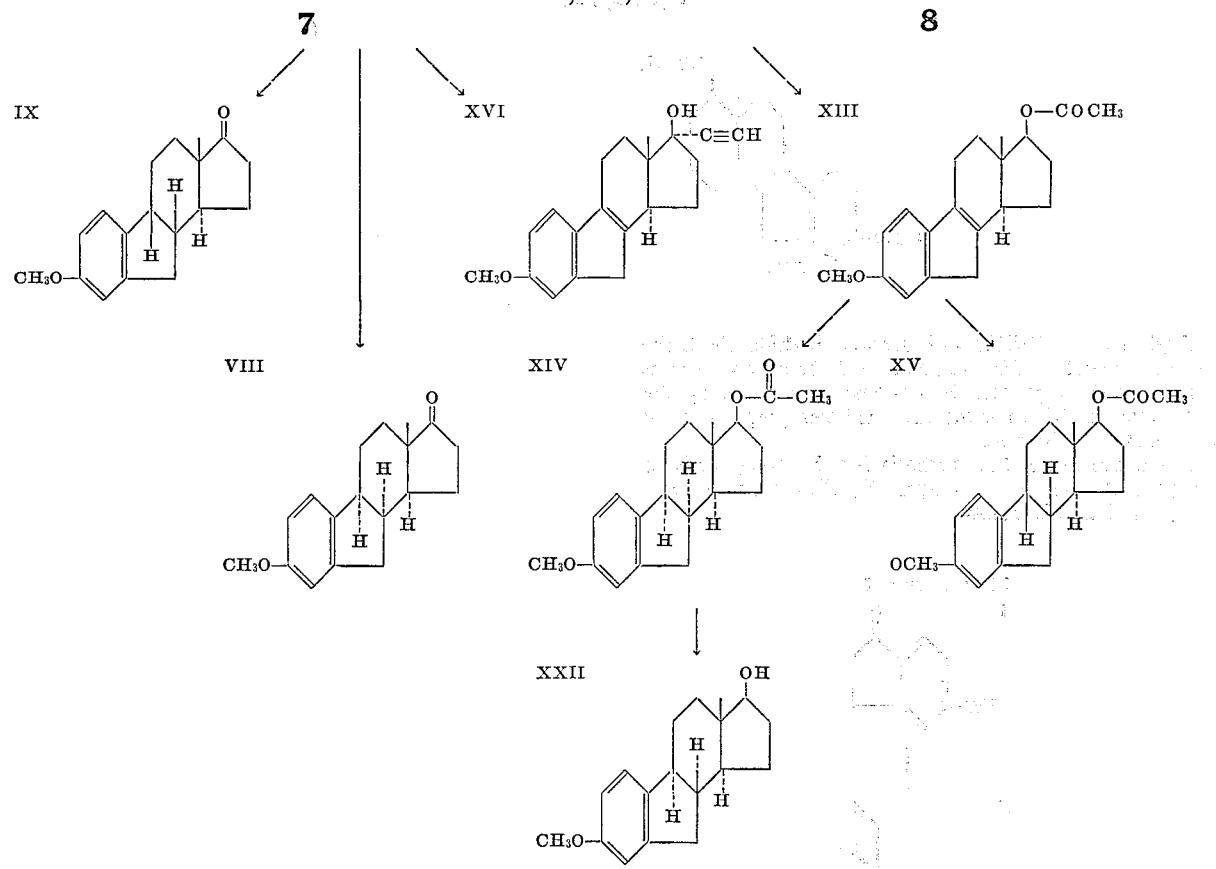
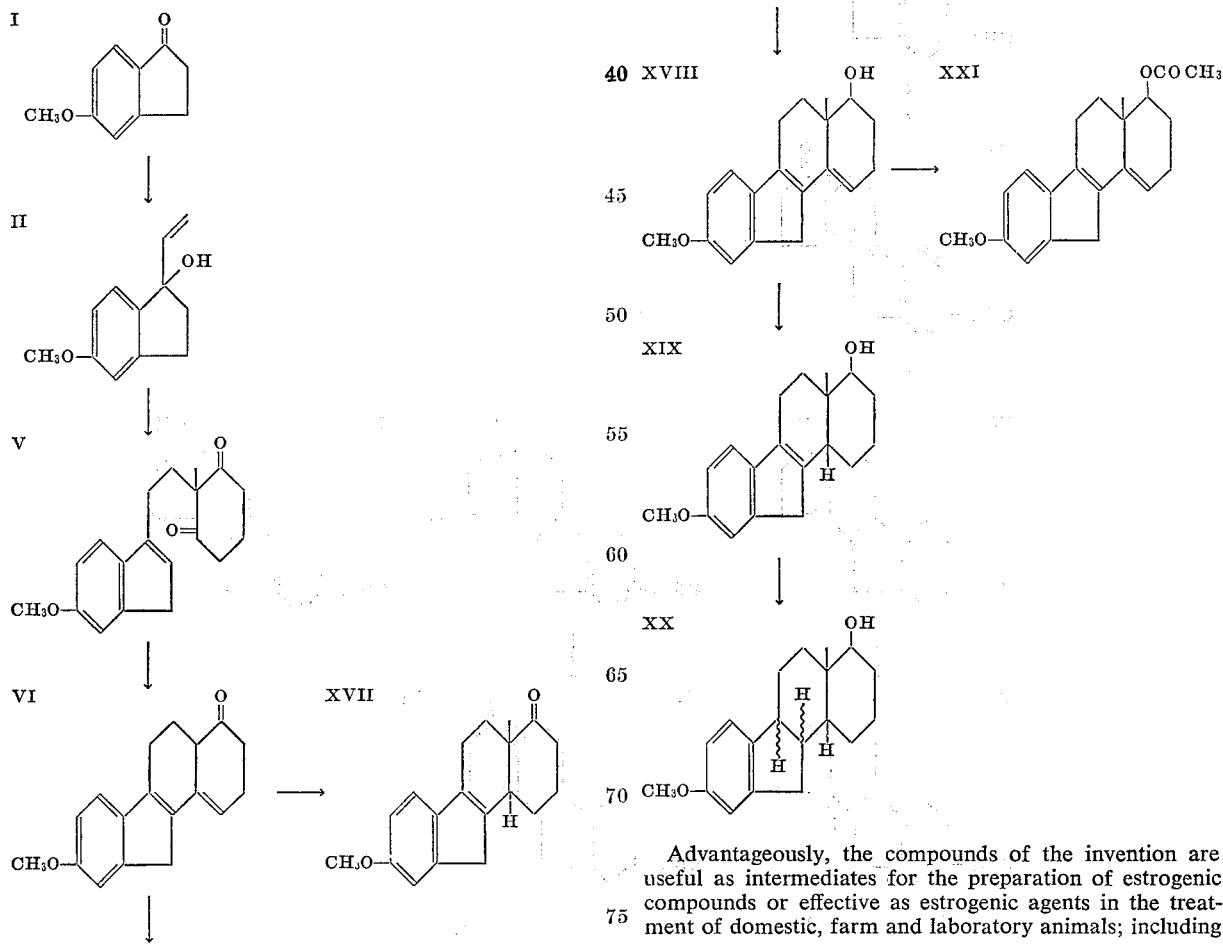
Advantageously, the compounds of the invention are useful as intermediates for the preparation of estrogenic compounds or effective as estrogenic agents in the treatment of domestic, farm and laboratory animals; including sheep, cattle, swine, goats, dogs, rabbits, rats and guinea pigs. In practice these compounds may be administered orally in animal feed of drinking water or as a pill, tablet, capsule, drench or the like. They may also be administered parenterally and are readily formulated for administration in conventional pharmaceutically acceptable carriers.

With small animals such as rabbits, guinea pigs and rats, generally about 0.1 to 10 mg./head/day and preferably 0.1 to 5.0 mg./head/day active ingredient is effective for obtaining the desired estrogen response. However, with larger animals increased doses are generally required. Testing data as estrogens on small animals is described in the examples hereinafter.

DETAILED DESCRIPTION

The following examples describe in detail the preparation of representative compounds of the present invention and testing as estrogens of representative steroids prepared herein.

EXAMPLE 1

Preparation of 5-methoxyindan-1-one (I)

A 139 g. quantity of polyphosphoric acid is stirred mechanically in a 600 ml. beaker and heated to 130° C. The heating means is removed and 28 g. of the acid added within about one minute while the temperature is maintained at 130° C. by cooling with a water bath. The reaction mixture is maintained at 130° C. for several minutes and allowed to cool to about 100° C. Cracked ice is added rapidly followed by water to dissolve the polyphosphoric acid. The aqueous suspension is extracted with 300 ml. portions of ethyl acetate. The ethyl acetate solution is washed with 2 N sodium carbonate followed by water. The product is used as such in the next step.

EXAMPLE 2

Preparation of 5-methoxy-1-vinylindan-1-ol (II)

A 2-liter-4-neck flask is charged with 10.95 g. (0.45 mole) of magnesium turnings and 100 ml. of dry tetrahydrofuran. A few drops of 1,2-dibromoethane and several drops of vinyl bromide are added. The reaction mixture is maintained at approximately 45° C. while a solution of 72 g. (0.675 mole) of vinyl bromide in 25 ml. tetrahydrofuran is added over a period of about 20 minutes. When the magnesium has reacted, an additional 100 ml. of tetrahydrofuran is added. A hot solution of 48.75 g. (0.3 mole) of 5-methoxyindan-1-one (Example 1) in 100 ml. tetrahydrofuran is added at about 35° C. over a period of a few minutes. The reaction is exothermic. The reaction mixture is refluxed fifteen minutes and allowed to cool to room temperature.

To the mixture 400 ml. of ether is then added and the reaction mixture cooled in an ice bath while 400 ml. of 10% ammonium chloride solution is added cautiously to decompose excess vinyl magnesium bromide and liberate the product. The ether layer is separated, washed with water and dried over anhydrous potassium carbonate. Evaporation of the ether leaves 57.7 g. (100%) of oil (i.e., the crude product). This product is sensitive to acid and is used as such in the next step.

EXAMPLE 3

Preparation of (±)-3-methoxy-8,14-seco-B-norestra-1,3,5(10),9-(11)-tetraen-14,17-dione (III)

A solution of 40 g. (0.21 mole) of 5-methoxy-vinylindane-1-ol (Example 2) in 210 ml. of 95% ethanol is slowly added to a stirring solution of 23.8 g. (0.21 mole) of 2-methylcyclopentane-1,3-dione in 315 ml. of 95% ethanol and 38 g. (0.42 mole) of pyridine at room temperature. The reaction mixture is refluxed 95 minutes and stirred at 60° C. an additional hour. The solvents are evaporated and the residue partitioned between water and ether. The ether solution is washed with water, 10% sodium carbonate solution and dried over sodium sulfate. Evaporation of the solvent leaves 55.3 g. (0.194 mole), 94% of crystalline product which when recrystallized from isopropanol has melting point 83° C.

*Analysis.*—Calcd. for $C_{18}H_{20}O_3$ (percent): C, 76.03; H, 7.09. Found (percent): C, 76.38; H, 7.15.

EXAMPLE 4

Preparation of (±)-3-methoxy-B-norestra-1,3,5(10), 8,14-pentaen-17-one (IV)

The diketone (±)-3-methoxy-8,14-seco-B-norestra-1,3, 5-(10),9(11)-tetraen-14,17-dione (Example 3) 55.3 g. (0.196 mole), is dissolved in 550 ml. methanol, and 50 ml. of 6 N hydrochloric acid added in 10 ml. portions. The product begins crystallizing immediately. After standing overnight the product is recovered by filtration and washed with methanol. The yield is 41.0 g. (0.154 mole), crude product which is recrystallized from nitromethane to yield product melting point 160.5–161° C.

*Analysis.*—Calcd. for $C_{18}H_{18}O_2$ (percent): C, 81.17; H, 6.81. Found (percent): C, 81.20; H, 6.61.

EXAMPLE 5

Preparation of (±)-3-methoxy-8,14-seco-D-homo-B-norestra-1,3,5(10),9(11)-tetraen-14,17α-dione (V)

A solution of 5.46 g. (0.0434 mole) 2-methylcyclohexane-1,3-dione and 6.86 g. (0.0868 mole) pyridine in 100 ml. of 95% ethanol is treated with an ethanolic solution of the vinyl alcohol 5-methoxy-1-vinylindane-1-ol calculated to contain a slight excess over the theoretical amount. The reaction mixture is refluxed, the mixture cooled to 0° C. and the product collected by filtration. The yield is 6.2 g. (0.0208 mole) which is recrystallized from absolute ethanol to yield product, M.P. 100–101° C.

*Analysis.*—Calcd. for $C_{19}H_{22}O_3$ (percent): C, 76.48; H, 7.43. Found (percent): C, 76.11; H, 7.43.

EXAMPLE 6

Preparation of (±)-3-methoxy-B-nor-D-homo-estra-1,3,5(10),8,14-pentaen-17α-one (VI)

A solution of 2 g. (6.72 millimoles) of the diketone (±)-3-methoxy-8,14-seco-D-homo-B-norestra - 1,3,5(10), 9(11)-tetraen-14,17α-dione in 50 ml. methanol is treated with a solution of 336 mg. of p-toluene-sulfonic acid in 10 ml. methanol. The reaction mixture is stirred 2½ hours at room temperature, the product recovered by filtration and then washed with methanol. The yield is 1.50 g. (5.36 millimoles), of crude product which is recrystallized from acetonitrile to yield a product having a M.P. 151–151.5° C.

*Analysis.*—Calcd. for $C_{19}H_{20}O_2$ (percent): C, 81.39; H, 7.19. Found (percent): C, 81.55; H, 7.14.

EXAMPLE 7

Preparation of (±)-3-methoxy-B-norestra-1,3,5(10),8-tetraen-17-one (VII)

A suspension of 400 mg. 5% palladium hydroxide on calcium carbonate in 20 ml. dry benzene is prereduced and a solution of 10 g. (0.0376 mole) of the diolefin (±) - 3 - methoxy - B - norestra-1,3,5(10),8,14-pentaen-17-one in 180 ml. of benzene is added. The theoretical 1 mole of hydrogen is absorbed in eighty minutes. The product is recovered, crystallized from a methanol and recrystallized from absolute ethanol to yield compound melting at 119–119.5° C.

*Analysis.*—Calcd. for $C_{18}H_{20}O_2$ (percent): C, 80.56; H, 7.51. Found (percent): C, 80.57; H, 7.52.

EXAMPLES 8 AND 9

Preparation of (±)-3-methoxy-B-nor-8α-estra-1,3,5(10)-trien-17-one (VIII)

A suspension of 200 mg. 5% palladium on calcium carbonate in 10 ml. benzene is prereduced and a solution of 1.0 g. (3.75 millimoles) of (±)-3-methoxy-B-norestra-1,3,5(10),8,14-pentaen-17-one in 10 ml. of benzene added. After about 20 hours the hydrogen absorption has essentially stopped. The catalyst is removed by filtration and the solvent evaporated. The residue is crystallized from absolute ethanol and then recrystallized again from absolute ethanol to yield 334 mg., product M.P. 119–120° C.

*Analysis.*—Calcd. for $C_{18}H_{22}O_2$ (percent): C, 79.96; H, 8,20. Found (percent): C, 80.20; H, 8.19.

The filtrate contains the isomeric 6-methoxy-B-nor-9β-estra-1,3,5(10)-trien-17-one (IX).

EXAMPLE 10

Preparation of (±)-3-methoxy-B-norestra-1,3,5(10),8,14-pentaen-17β-ol (X)

A mixture of 50 g. (0.188 mole) of the ketone, (±)-3-methoxy-B-norestra-1,3,5(10),8,14-pentaen-17-one, 7.8 g. (0.206 mole) sodium borohydride and two liters of 95% ethanol is stirred overnight at room temperature. Most of the ethanol is evaporated, and the residue partitioned between water and methylene chloride. The organic layer is separated, washed with water and dried with sodium sulfate. The solution is treated with a small amount of activated carbon and filtered. The solvent is evaporated, and the residue slurred with 95% ethanol and filtered. After recrystallization from 95% ethanol the compound M.P. 168.5–169° C.

*Analysis.*—Calcd. for $C_{18}H_{20}O_2$ (percent): C, 80.56; H, 7.51. Found (percent): C, 80.63; H, 7.56.

EXAMPLE 11

Preparation of (±)-3-methoxy-B-norestra-1,3,5(10), 8,14-pentaen-17β-ol acetate (XI)

A mixture of 100 ml. pyridine, 15.3 g. acetic anhydride and 20 g. (0.0748 mole) of (±)-3-methoxy-B-norestra-1,3,5(10),9,14-pentaen-17β-ol is left standing overnight. The mixture is drowned in water and the product recovered by ether extraction. The ether extract is washed with 2N sulfuric acid and with water. Evaporation of the dried (sodium sulfate) solution gives crude material which is slurried in cold 95% ethanol, collected by filtration, and recrystallized from 95% ethanol to yield the acetate, M.P. 105–106° C.

*Analysis.*—Calcd. for $C_{20}H_{22}O_3$ (percent): C, 77.39; H, 7.14. Found (percent): C, 77.37; H, 7.11.

EXAMPLE 12

Preparation of (±)-3-methoxy-B-norestra-1,3,5(10), 8-tetraen-17β-ol (XII)

A suspension of 1.5 g. palladium on calcium carbonate in 50 ml. of benzene is prereduced and a solution of 24 g. (0.0894 mole) of (±)-3-methoxy-B-norestra-1,3,5(10), 8,14-pentaen-17β-ol in 550 ml. of benzene is added. The theoretical amount of hydrogen is taken up in one hour. The product tends to crystallize in the reduction mixture. The catalyst is removed by filtration, and extracted with hot benzene. Evaporation of the solvent leaves a solid which is slurried with cold methanol and recovered by filtration. This product is very insoluble in methylene chloride and when recrystallized from acetonitrile, gives the compound having, M.P. 144–145° C.

*Analysis.*—Calcd. for $C_{18}H_{22}O_2$ (percent): C, 79.96; H, 8.20. Found (percent): C, 80.03; H, 8.25.

EXAMPLE 13

Preparation of (±)-3-methoxy-B-norestra-1,3,5(10), 8-tetraen-17β-ol acetate (XIII)

A hydrogenation flask is charged with 1 g. 5% palladium on carbon catalyst, 250 ml. benzene and 19.22 g. (0.062 mole) of (±)-3-methoxy-B-norestra-1,3,5(10),8,14-pentaen-17β-ol acetate. The hydrogen absorption requires about six hours. The product is recovered and crystallized from a small amount of acetonitrile. The purified product, M.P. 110.5–111° C. An identical product is obtained by acylation of the corresponding alcohol with acetic anhydride-pyridine.

*Analysis.*—Calcd. for $C_{20}H_{24}O_3$ (percent): C, 76.87; H, 7.74. Found (percent): C, 77.08; H, 7.79.

EXAMPLES 14 AND 15

Preparation of (±)-3-methoxy-B-nor-8α-estra-1,3,5(10)-trien-17β-ol acetate (XIV)

A suspension of 1 g. of 5% palladium on calcium carbonate catalyst in 25 ml. of benzene is prereduced with hydrogen and a solution of 10 g. (32 millimoles) of (±)-3 - methoxy-B-norestra-1,3,5(10),8-tetraen-17β-ol acetate in 50 ml. of dry benzene is added. The hydrogen uptake requires about twenty hours. The product is worked up by filtering off the catalyst and evaporating the solvent. The solid residue is slurried with absolute ethanol and recovered by filtration, M.P. 113.5–114.5° C. The product recrystallizes from absolute ethanol and from an acetone-hexane mixture.

*Analysis.*—Calcd. for $C_{20}H_{26}O_2$ (percent): C, 76.40; H, 8.34. Found (percent): C, 76.43 and 77.06; H, 8.75 and 8.32.

This same compound is obtained when the corresponding hydroxy compound is reduced under these same conditions and acetylated. When the reduction of the acetate is done in acetic acid with added perchloric acid over palladium supported on carbon the reduction is rapid and a mixture of diasterio isomers are obtained in approximately equal amounts. The isomer, M.P. 113–114° C. is readily separated with methanol in which it is insoluble. The other isomer remains dissolved in the methanol.

Reduction of the acetate (XIII) in acetic acid and perchloric acid yields compound (XV) shown in flow diagram I.

EXAMPLE 16

Preparation of 17α-ethynyl-3-methoxy-B-norestra-1,3,5(10),8-tetraen-17β-ol (XVI)

A flask is charged with 130 ml. dry dimethyl formamide and 0.74 g. (0.016 mole) of 52% sodium hydride mineral oil dispersion. The reaction mixture is stirred at −10° C. and acetylene is passed into the reaction mixture until the solvent is saturated with acetylene. A solution of 1.34 g. (0.005 mole) of (±)-3-methoxy-B-norestra-1,3,5(10),8-tetraen-17-one in 25 ml. of dry dimethyl formamide is added from a dropping funnel over a few minutes. Acetylene is passed into the stirring solution at −10° C. for three hours. Then 2 ml. of water is added very cautiously and the mixture is acidified with 6 N sulfuric acid. The product is extracted with ether. The crude product is poured into a 1:1 benzene-hexane mixture through an activated magnesium silicate column and the desired product is eluted with benzene. Recrystallization from methanol yields 162 mg. of the acetylenic alcohol, M.P. 151.5–152° C.

*Analysis.*—Calcd. for $C_{20}H_{22}O_2$ (percent): C, 81.60; H, 7.53. Found (percent): C, 81.36; H, 7.62.

EXAMPLE 17

Preparation of (±)-3-methoxy-B-nor-D-homo-estra-1,3,5 (10),8-tetraen-17α-one (XVII)

A suspension of 50 mg. 5% palladium on calcium carbonate in 10 ml. of benzene is prereduced and a solution of 1.0 g. (3.56 millimoles) of (±)-3-methoxy-B-nor-D-homo-estra-1,3,5(10),8,14-pentaen-17α-one in 16 ml. of benzene is added. One equivalent of hydrogen is taken up in 17 minutes and the reduction is stopped. Removal of the catalyst and evaporation of the solvent leaves 1 g. of solid residue which is recrystallized from 20 ml. absolute ethanol to yield 889 mg., 89% M.P. 138.5–139° C.

*Analysis.*—Calcd. for $C_{19}H_{22}O_2$ (percent): C, 80.81; H, 7.85. Found (percent): C, 81.11; H, 7.91.

EXAMPLE 18

Preparation of (±)-3-methoxy-B-nor-D-homo-estra-1,3,5(10),8,14-pentaen-17αβ-ol (XVIII)

A mixture of 20.8 g. (0.1 mole) of (±)-3-methoxy-B-nor-D-homo-estra-1,3,5(10),8,14 - pentaen - 17α - one, 500 ml. 95% ethanol and 3.78 g. (0.1 mole) of sodium borohydride is left standing overnight. The reaction mixture is diluted with water and methylene chloride added. The two phase system is acidified with hydrochloric acid and the organic layer separated. The solution is washed with water and dried with sodium sulfate. Evaporation of the solvent and recrystallization from 95% ethanol yields 24.2 g. (0.083 mole), 83% of the alcohol, M.P. 133–134° C.

*Analysis.*—Calcd. for $C_{19}H_{22}O_2$ (percent): C, 80.81; H, 7.85. Found (percent): C, 80.90; H, 7.74.

EXAMPLES 19 AND 20

Preparation of (±)-3-methoxy-B-nor-D-homo-estra-1,3,5(10),8-tetraen-17αβ-ol (XIX)

A suspension of 50 mg. 5% palladium on calcium carbonate in 5 ml. of benzene is prereduced and a solution of 700 mg. (2.5 millimoles) of (±)-3-methoxy-B-nor-D-homo - estra - 1,3,5(10),8,14 - pentaen - 17αβ-ol in 5 ml. of benzene is added. The theoretical 63 ml. of hydrogen is taken up in 27 minutes. The catalyst is removed by filtration and the solvent evaporated leaving a residue which is recrystallized from acetone to yield the product having M.P. 151–152° C.

*Analysis.*—Calcd. for $C_{19}H_{24}O_2$ (percent): C, 80.24; H, 8.51. Found (percent): C, 80.37; H, 8.25.

When the reduction is allowed to proceed until it stops, the isomer of the structure:

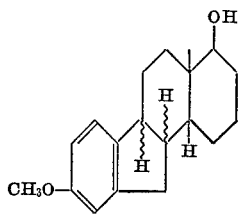

XX is obtained.

EXAMPLE 21

Preparation of (±)-3-methoxy-B-nor-D-homo-estra-1,3,5(10),8,14-pentaen-17αβ-ol acetate (XXI)

A solution of 700 mg. (25 millimoles) of (±)-3-methoxy - B - nor - D - homo-estra-1,3,5(10),8,14-pentaen-17αβ-ol in 3 ml. pyridine is treated with 2 ml. of acetic anhydride and left standing overnight. The reaction mixture is poured into water and the product extracted with methylene chloride. The extract is washed with dilute sulfuric acid, water, and dried over sodium sulfate. The solvent is evaporated and the residue recrystallized from absolute ethanol to yield 653 mg. (2 millimoles), 80% of the acetate, M.P. 127.5–128.5° C.

*Analysis.*—Calcd. for $C_{21}H_{24}O_3$ (percent): C, 77.75; H, 7.46. Found (percent): C, 77.47; H, 7.35.

EXAMPLE 22

Preparation of (±)-3-methoxy-B-nor-8α-estra-1,3,5(10)-trien-17β-ol (XXII)

A solution of 1 g. (3.49 millimoles) of (±)-3-methoxy-B-nor - 8α - estra - 1,3,5(10) - trien-17β-ol acetate, 30 ml. 95% ethanol, and 0.5 g. KOH is refluxed two hours. The reaction mixture is distributed between water and methylene chloride and the product recovered from the methylene chloride, and crystallized from an acetone-hexane mixture to yield product having M.P. 98.5–99.5° C.

*Analysis.*—Calcd. for $C_{18}H_{24}O_2$ (percent): C, 79.37; H, 8.88. Found (percent): C, 79.05; H, 9.04.

EXAMPLE 23

Preparation of diet

The diet employed in the following tests to determine the efficacy of the compound of the invention as estrogenic age agents is provided below.

Diet

| | Percent |
|---|---|
| Crude protein (min.) | 24.0 |
| Crude fat (min.) | 4.0 |
| Crude fiber (max.) | 4.5 |

Ingredients

Animal liver meal, fish meal, dried whey, corn and wheat flakes, ground yellow corn, ground oat groats, dehulled soybean meal, wheat germ meal, wheat middlings, cane molasses, dehydrated alfalfa meal, soybean oil, brewers dried yeast, vitamin A palmitate, irradiated dried yeast (source of vitamin $D_2$), riboflavin, niacin, calcium pantothenate, chlorine chloride, D-activated animal sterol, a-tocopherol thiamine hydrochloride, menadione sodium disulfite (source of vitamin K activity), dicalcium phosphate, salt and traces of: manganous oxide, copper sulfate, iron carbonate, potassium iodate, cobalt sulfate and zinc oxide.

EXAMPLE 24

Estrogen assay

Immature female Wistar origin rats are 19 to 21 days of age and are employed as the test animal to determine estrogenic activity of candidate compounds. Test compounds are given by subcutaneous injections once daily for three successive days in 0.2 ml. of injection vehicle. This injection vehicle is:

Carboxymethylcellulose (low viscosity)—0.5 gm.
Tween 80—0.4 gm.
Sodium chloride—0.9 gm.
Polyethylene glycol (Carbowax 300)—10.0 ml.
Distilled water—90.0 ml.

Twenty-four hours after the third injection the rats are sacrificed, the uteri removed and disected free from the ovaries, oviducts and mesentery. Each uterine horn is split longitudinally and the uterine fluid blotted dry. The uteri are weighed to the nearest milligram on a balance. Ten rats are used for each treatment. Increased uterine weight over the control (untreated) uteri indicates estrogenic activity. All animals received a commercial laboratory animal ration ad libitum and fresh water is available at all times while on test. The following Table I summarizes the estrogen assay testing data.

TABLE I

| Compound: | Effective dose, mg./rat/day |
|---|---|
| (±) - 3 - methoxy - 8,14-seco-B-norestra-1,3,5(10),9(11)-tetraen-14,17-dione (III) | 0.5 |
| (±) - 3 - methoxy - B - norestra-1,3,5(10),8-tetraen-17β-ol acetate (XIII) | 0.5 |
| (±) - 3 - methoxy - B - nor - 8α - estra-1,3,5(10)-trien-17β-ol acetate (XIV) | 0.125 |
| 17α - ethynyl - 3 - methoxy-B-norestra-1,3,5(10),8-tetraen-17β-ol (XVI) | 0.5 |
| (±) - 3 - methoxy - B - nor-D-homo-estra-1,3,5(10),2-tetraen-17β-ol (XIX) | 0.5 |
| (±) - 3 - methoxy - B - nor - 8α-estra-1,3,5(10)-trien-17β-ol (XXII) | 0.5 |
| (±) - 3 - methoxy - B - nor - 8α-estra-1,3,5(10)-trien-17-one (VIII) | 0.5 |
| (±) - 3 - methoxy - B - nor-D-homo-estra-1,3,5,(10),8,14-pentaen-17αβ-ol (XVIII) | 0.5 |
| (±) - 3 - methoxy - B - nor-D-homo-estra-1,3,5(10),8-tetraen-17α-one (XVII) | 0.5 |

I claim:
1. A compound of the formula:

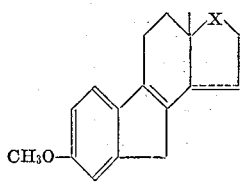

wherein X is selected from the group consisting of

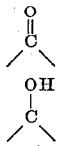

and

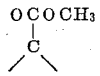

— — — — is a double bond or single bond, with the proviso that when no double bond exists at C–14 (15), the hydrogen at C–14 is alpha and X is

or

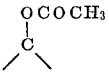

2. The compound in accordance with claim 1, (±)-3-methoxy - β - norestra - 1,3,5(10),8,14-pentaen-17-one.
3. The compound in accordance with claim 1, (±)-3-methoxy-β-norestra-1,3,5(10),8,14-pentaen-17β-ol.
4. The compound in accordance with claim 1, (±)-3-methoxy - β - norestra - 1,3,5(10),8,14 - pentaen-17β-ol acetate.
5. The compound (±) - 3 - methoxy - B - norestra-1,3,5(10)-8-tetraen-17β-ol acetate.
6. The compound in accordance with claim 1, (±)-3-methoxy-β-norestra-1,3,5(10),8-tetraen-17β-ol.

References Cited
UNITED STATES PATENTS 3,317,566  5/1967  Whitehurst et al. ____ 260—590
3,318,922  5/1967  Windholz et al. _____ 260—590
3,377,361  4/1968  Fare et al. _____ 260—488

OTHER REFERENCES
Burckhalter et al., J. Org. Chem., pp. 3968–73, 32, 1967.
Heidepriem et al., Liebigs Ann. Chem., 712, 155–167 (1968).

LEWIS GOTTS, Primary Examiner
V. GARNER, Assistant Examiner

U.S. Cl. X.R.
260—491, 586R, 590, 613R, 619F; 424—311, 331, 341, 346